(12) United States Patent
Zeumer

(10) Patent No.: US 8,006,940 B2
(45) Date of Patent: Aug. 30, 2011

(54) METHOD AND APPARATUS FOR DEPLOYING AN AUXILIARY LIFT FOIL

(75) Inventor: Claus M Zeumer, Bristol (GB)

(73) Assignee: Airbus Operations Limited, Bristol (GB)

( * ) Notice: Subject to any disclaimer, the term of this patent is extended or adjusted under 35 U.S.C. 154(b) by 577 days.

(21) Appl. No.: 12/076,593

(22) Filed: Mar. 20, 2008

(65) Prior Publication Data

US 2008/0265089 A1    Oct. 30, 2008

(30) Foreign Application Priority Data

Apr. 30, 2007 (GB) .................................. 0708334.8

(51) Int. Cl.
*B64C 3/50* (2006.01)
(52) U.S. Cl. ...................................................... 244/215
(58) Field of Classification Search .......... 244/211–213, 244/215–217, 90 R, 99.3
See application file for complete search history.

(56) References Cited

U.S. PATENT DOCUMENTS

| | | | | | |
|---|---|---|---|---|---|
| 4,172,575 | A | * | 10/1979 | Cole | 244/216 |
| 4,784,355 | A | * | 11/1988 | Brine | 244/213 |
| 2007/0034748 | A1 | * | 2/2007 | Sakurai et al. | 244/215 |
| 2009/0134281 | A1 | * | 5/2009 | Engelbrecht et al. | 244/215 |

FOREIGN PATENT DOCUMENTS

| | | |
|---|---|---|
| EP | 0 272 396 | 6/1988 |
| SE | 515 029 | 5/2001 |

OTHER PUBLICATIONS

Great Britain Search Report dated Aug. 15, 2007.

* cited by examiner

*Primary Examiner* — Timothy D Collins
*Assistant Examiner* — Valentina Xavier
(74) *Attorney, Agent, or Firm* — Nixon & Vanderhye P.C.

(57) ABSTRACT

Apparatus connecting an auxiliary lift foil, such as a flap or slat, to a main lift element. The apparatus comprises: a drop link pivotally coupled to the main lift element by a first hinge and to the auxiliary lift foil by a second hinge, wherein the drop link is substantially rigid between the first and second hinges; and a linkage mechanism pivotally coupled to the auxiliary lift foil by a third hinge which is spaced from the second hinge, and to the main lift element by as fourth hinge. The linkage mechanism comprises: a second link pivotally coupled to the airfoil by the third hinge; a third link pivotally coupled to the drop link and/or the auxiliary lift foil by a fifth hinge; and a lever pivotally coupled to the main lift element by a fourth hinge, to the second link by a sixth hinge, and to the third link by a seventh hinge.

The drop link is rotated clockwise about the first hinge. In a first phase the auxiliary lift foil is rotated anticlockwise about the second hinge relative to the drop link, and in a second phase it is rotated clockwise about the second hinge relative to the drop link.

13 Claims, 10 Drawing Sheets

METHOD AND APPARATUS FOR DEPLOYING AN AUXILIARY LIFT FOIL

FIELD OF THE INVENTION

The present invention relates to apparatus for connecting an auxiliary lift foil to a main lift element, and a method of deploying such an auxiliary lift foil. The auxiliary lift foil may be a hydrofoil, or an aerofoil such as a flap, slat, or aileron.

BACKGROUND OF THE INVENTION

Conventional mechanisms for connecting a flap to a main wing element include flap track mechanisms, drop link mechanisms, and multi-bar linkage mechanisms.

Flap track mechanisms employ a track on which the flap runs on roller bearings as it moves between its retracted and extended positions. The advantage of a flap track mechanism is that the track can be shaped to closely control the motion of the flap. The disadvantages are that the mechanism is heavy, complex, expensive to produce, and requires a large number of roller bearings (which are prone to failure).

Drop link mechanisms employ a rigid drop link which is pivotally coupled at one end to the main wing element and to the flap at the other end. A first advantage of a drop link mechanism is that it is simple and robust. A second advantage is that the drop link can transmit lift forces efficiently from the flap to the main wing element. A disadvantage is that only simple rotational motion can be imparted to the flap.

U.S. Pat. Nos. 2,608,364 and 4,605,187 disclose various multi-bar linkage mechanisms for deploying a trailing edge flap. A first advantage of these mechanisms is that they are relatively compact when the flap is in its fully retracted position. As a result, the aerodynamic effect of the mechanism is minimal, at least when the flap is retracted. A second advantage of these mechanisms is that they allow a relatively complex path to be followed by the flap, in comparison with a drop link mechanism. A first disadvantage is that the mechanism is relatively complex compared with a drop link mechanism. A second disadvantage is that the mechanism is not able to transmit lift forces efficiently from the flap to the main wing element, resulting in an inefficient and heavy structure.

SUMMARY OF THE INVENTION

A first aspect of the invention provides apparatus connecting an auxiliary lift foil to a main lift element, the apparatus comprising:
  a drop link pivotally coupled to the main lift element by a first hinge and to the auxiliary lift foil by a second hinge, wherein the drop link is substantially rigid between the first and second hinges; and
  a linkage mechanism pivotally coupled to the auxiliary lift foil by a third hinge which is spaced from the second hinge, and to the main lift element by a fourth hinge.

A second aspect of the invention provides a method of deploying an auxiliary lift foil from a main lift element using a drop link pivotally coupled to the main lift element by a first hinge and to the auxiliary lift foil by a second hinge, the method comprising:
  rotating the drop link about the first hinge in a first direction;
  in a first phase rotating the auxiliary lift foil about the second hinge relative to the drop link in a second direction opposite to the first direction; and
  in a second phase rotating the auxiliary lift foil about the second hinge relative to the drop link in the first direction.

The first direction of rotation may be clockwise and the second direction anticlockwise (or vice versa).

A third aspect of the invention provides a lift foil comprising a main lift element; an auxiliary lift foil; and apparatus according to the first aspect of the invention connecting the auxiliary lift foil to the main lift element.

The invention provides a mechanism in which the drop link is pivotally attached to both the main lift element and the auxiliary lift foil. This retains some of the advantages of a drop link, whilst allowing the auxiliary lift foil to follow a more complex path by rotating it about the second hinge as well as the first hinge when it is deployed.

Further preferred features of the mechanism are set out in the dependent claims.

In the embodiments of the invention described below, the main lift element comprises a main wing element and the auxiliary lift foil comprises an auxiliary aerofoil. In this case, preferably the auxiliary aerofoil comprises a trailing edge flap, although it may also be used for other auxiliary aerofoils such as slats or ailerons. However it will be appreciated that the invention may also be used in a sea-based vehicle in which the lift elements are hydrofoils.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
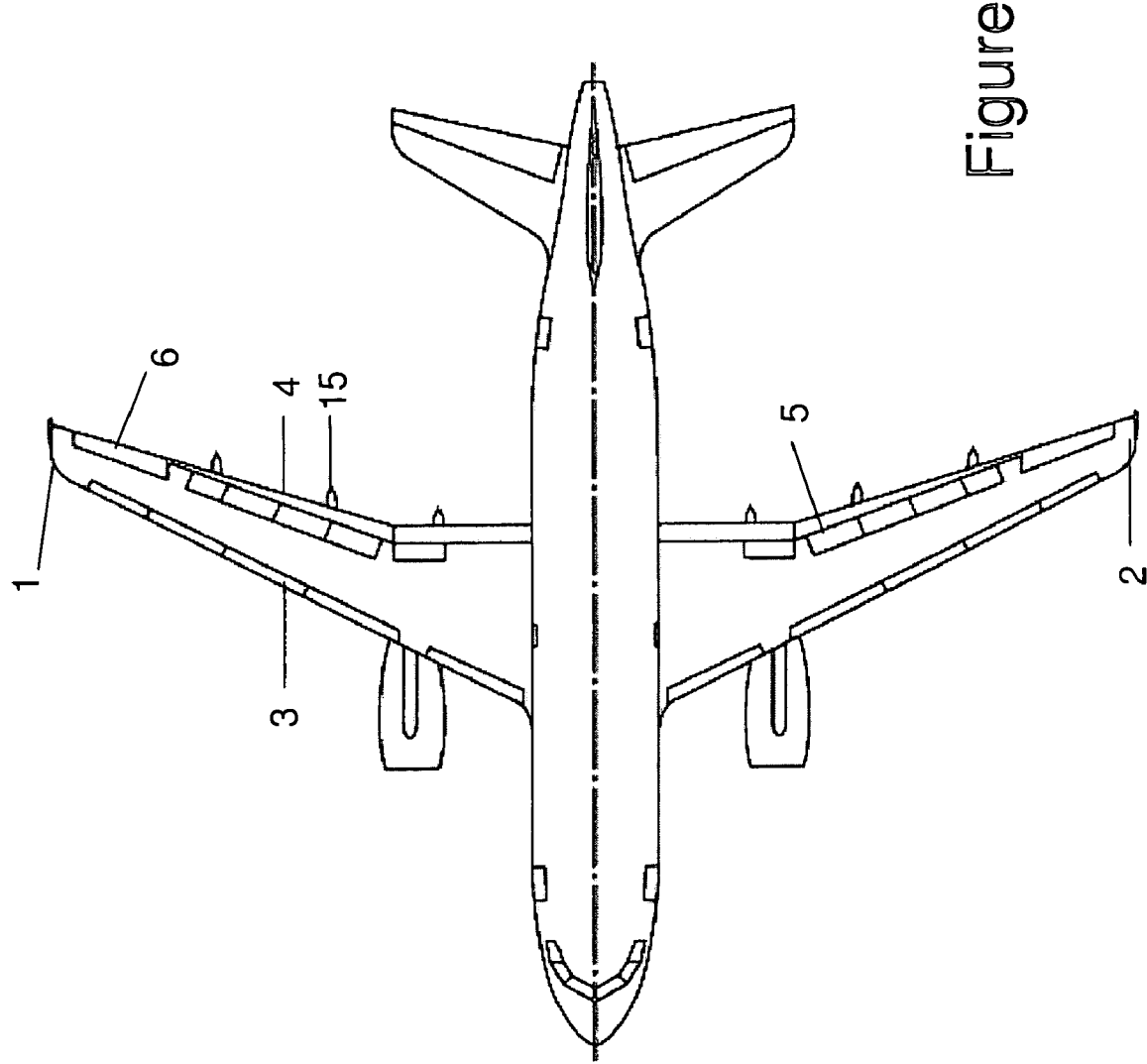
FIG. 1 is a plan view of an aircraft.

An aircraft shown in FIG. 1 comprises a pair of wings 1,2, each comprising a main wing element and a set of auxiliary aerofoils including leading edge slats 3, trailing edge flaps 4, spoilers 5 and ailerons 6.

Figure 2:
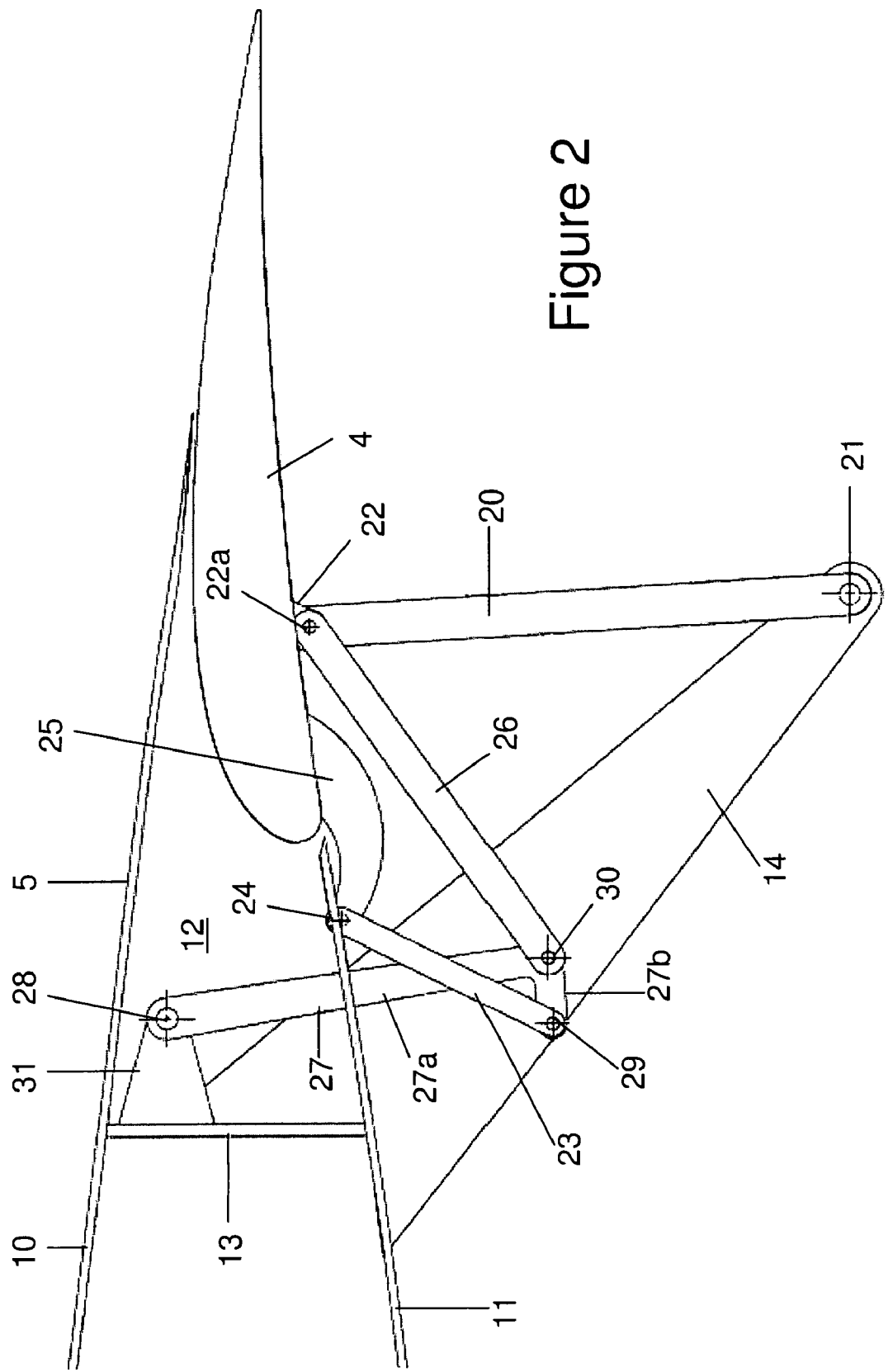
FIG. 2 is a side view of a flap deployment mechanism according to an embodiment of the invention, in its fully retracted position.

FIG. 2 is a side view of one of the trailing edge flaps 4, showing the mechanism connecting the flap 4 to the main wing element.

The main wing element has an upper aerodynamic surface 10 (including a spoiler 5) and a lower aerodynamic surface 11. A trailing edge cove 12 is formed between the spoiler 5, the lower aerodynamic surface 11 and a rear spar 13.

A strut 14 is attached to the spar 13 and extends downwardly from the lower surface 11. The strut 14 (along with the protruding parts of the linkage mechanism) are covered by a fairing 15 shown in FIG. 1 but omitted from FIG. 2. Note that instead of being attached to the rear spar 13, the strut 14 may be attached to some other part of the main wing element such as a lower panel.

A drop link 20 is pivotally coupled to the main wing element by a first hinge 21 at the distal end of the strut 14 and to the flap by a second hinge 22. The drop link 20 is substantially rigid between the first and second hinges (in other words, there are no further hinges in the drop link 20 between the first hinge 21 and the second hinge 22). Although the drop link 20 is shown with a fixed length, in an alternative embodiment (not shown) the drop link 20 may be formed by a pair of telescoping parts which expand as the flap is deployed.

A second link 23 is pivotally coupled to the flap 4 by a third hinge 24 which is spaced forward of the second hinge 22. In the example of FIG. 2 the third hinge 24 is carried by a rigid arm 25 which extends from the underside of the leading edge of the flap 4. However, in an alternative embodiment (not shown) the arm 25 may be omitted and the second link 23 coupled to the flap by a hinge mounted directly to the flap 4.

A third link 26 is pivotally coupled to the drop link 20 and the flap 4 by a fifth hinge 22a which is coaxial with the second hinge 22. By positioning the fifth hinge 22a coaxially with the second hinge, a single hinge bolt can be used for both hinges. In an alternative embodiment (not shown) the fifth hinge 22a may be positioned at some intermediate point along the length of the drop link 20, or on the flap 4, instead of being co-axial with the second hinge 22.

An L-shaped lever 27 is pivotally coupled to the spar 13 by a fourth hinge 28, to the second link 23 by a sixth hinge 29, and to the third link 26 by a seventh hinge 30. The lever 27 has a relatively long arm 27a connecting the seventh hinge 30 to the fourth hinge 28, and a relatively short arm 27b connecting the sixth hinge 29 to the seventh hinge 30. Note that although the lever 27 is L-shaped, the lever may be any shape (for instance triangular) as long as it is substantially rigid between the hinges 28, 29 and 30.

Figure 3:
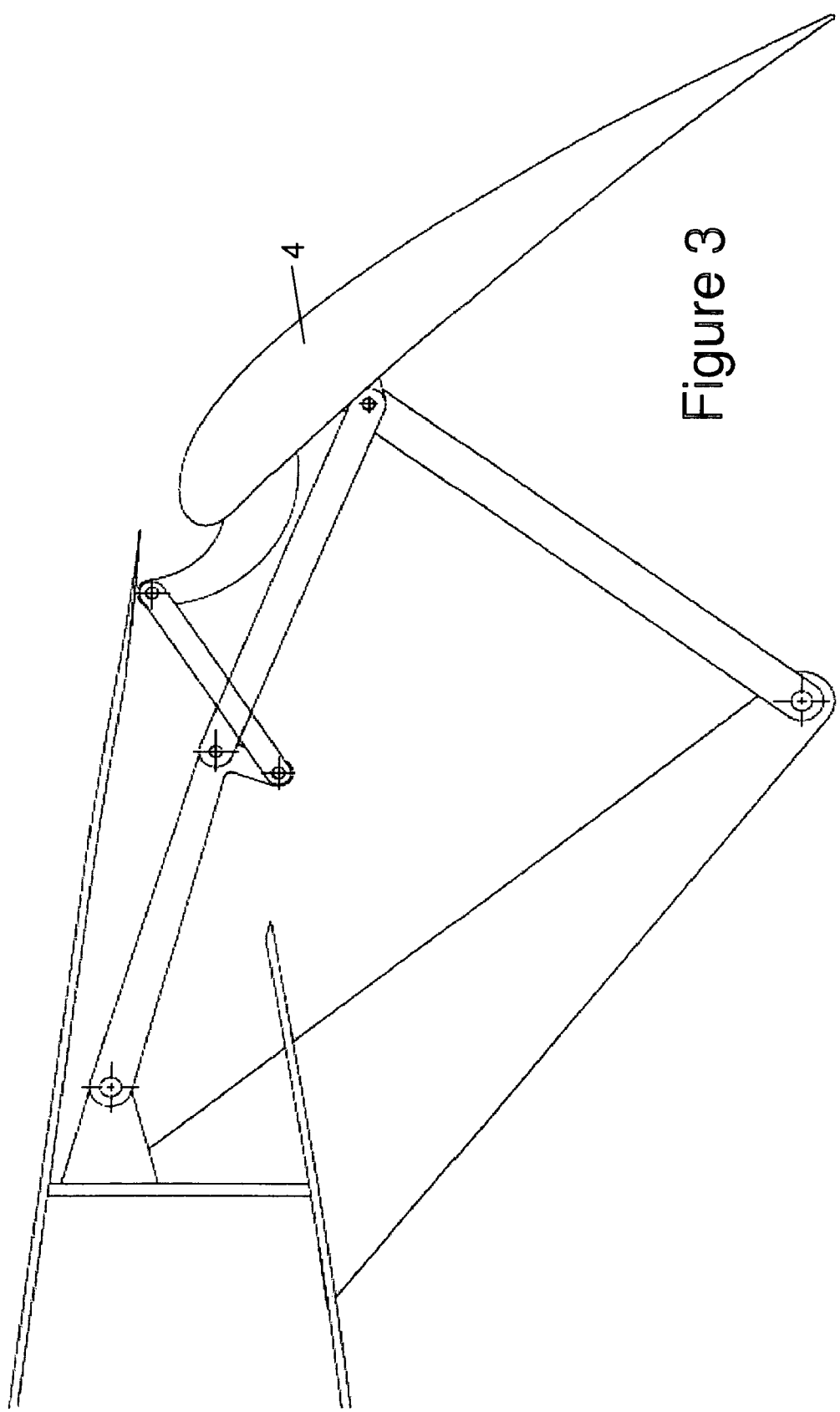
FIG. 3 shows the mechanism in its fully extended position.

A rotary actuator 31 is configured to rotate the lever 27 about the fourth hinge 28, which causes the flap to move from its retracted position shown in FIG. 2 to its fully extended position shown in FIG. 3. In an alternative embodiment (not shown) instead of using a rotary actuator 31 acting on the hinge 28, the rotary actuator may act on a different hinge of the linkage mechanism. Alternatively, a linear actuator (such as a hydraulic piston or a threaded rod) may act on one of the links such as the drop link 20, or directly on the flap 4.

Figure 4:
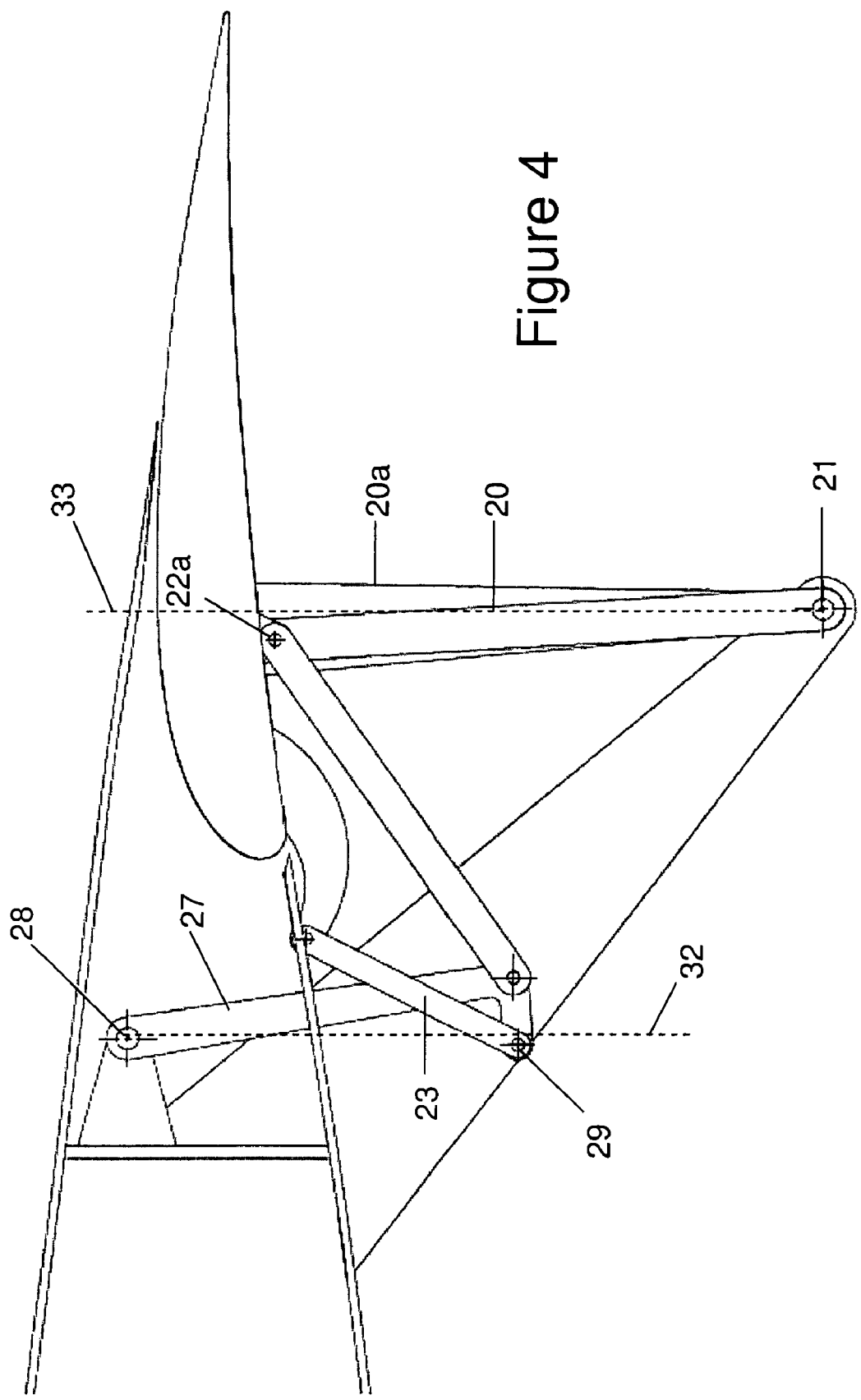
FIG. 4 shows the mechanism in its fully retracted position, superimposed against a simple drop link mechanism.
Figure 5:
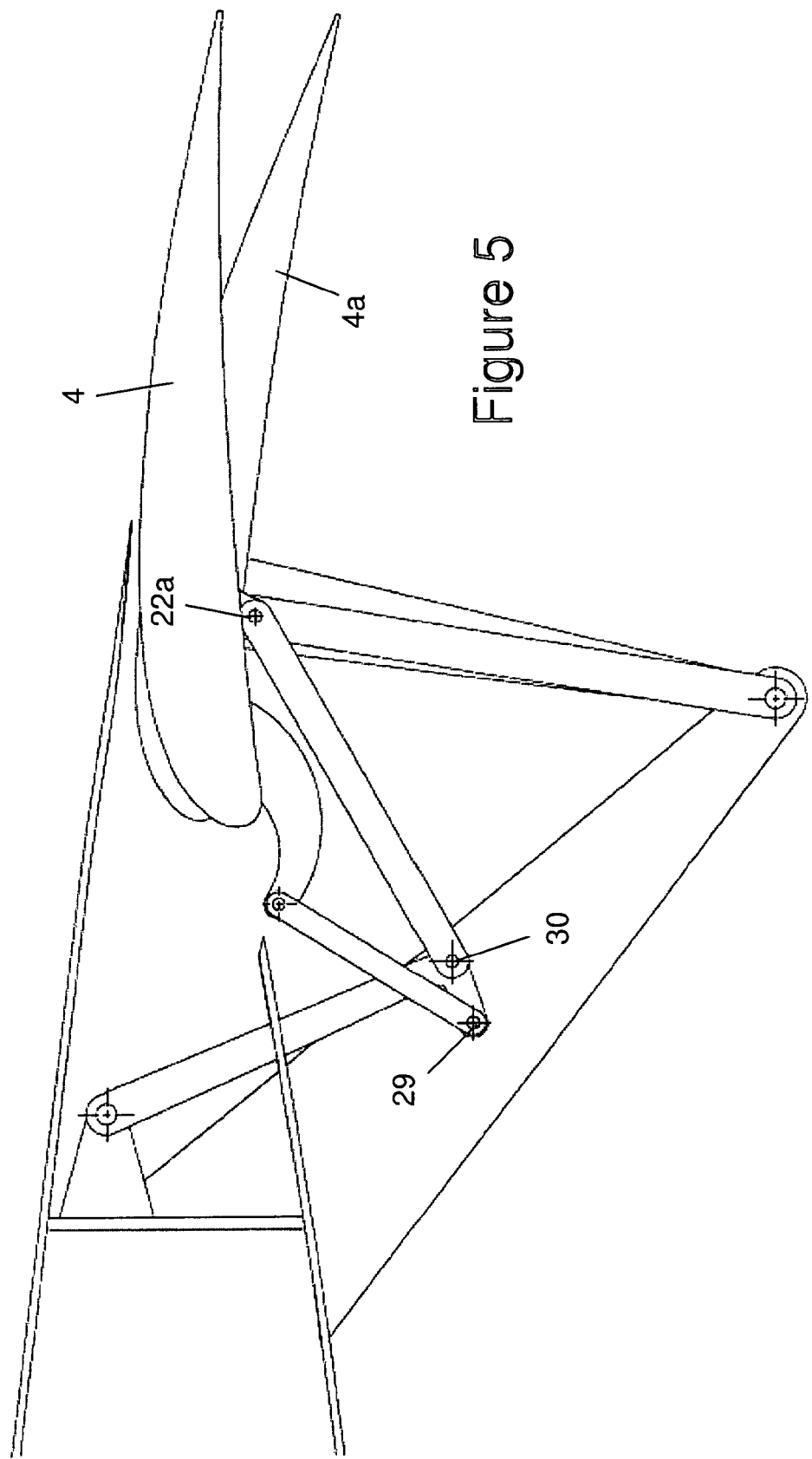
FIGS. 5-8 shows the mechanisms of FIG. 4 with their drop links rotated by 10°, 23°, 36° and 38° respectively.
Figure 6:
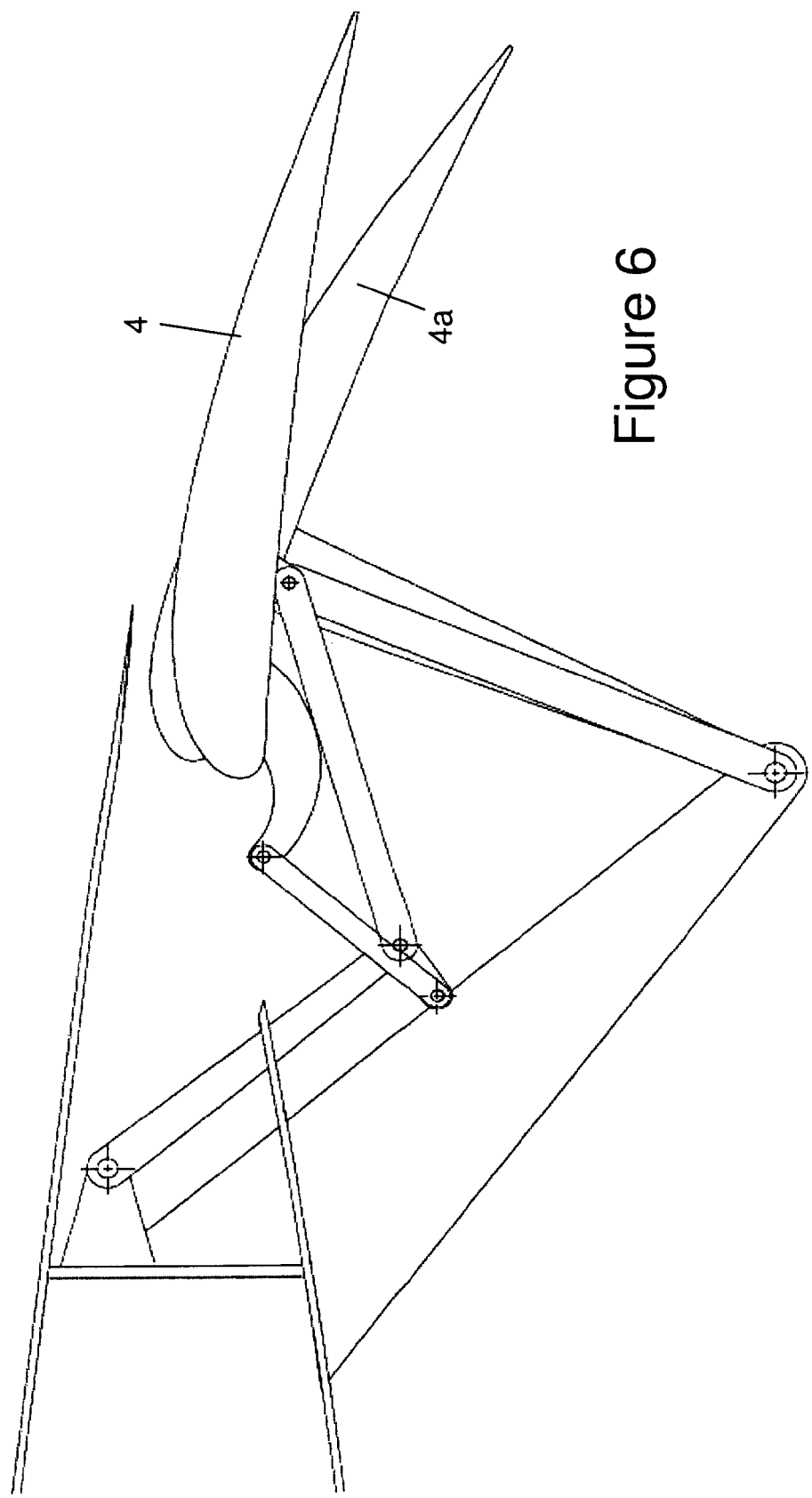
Figure 7:
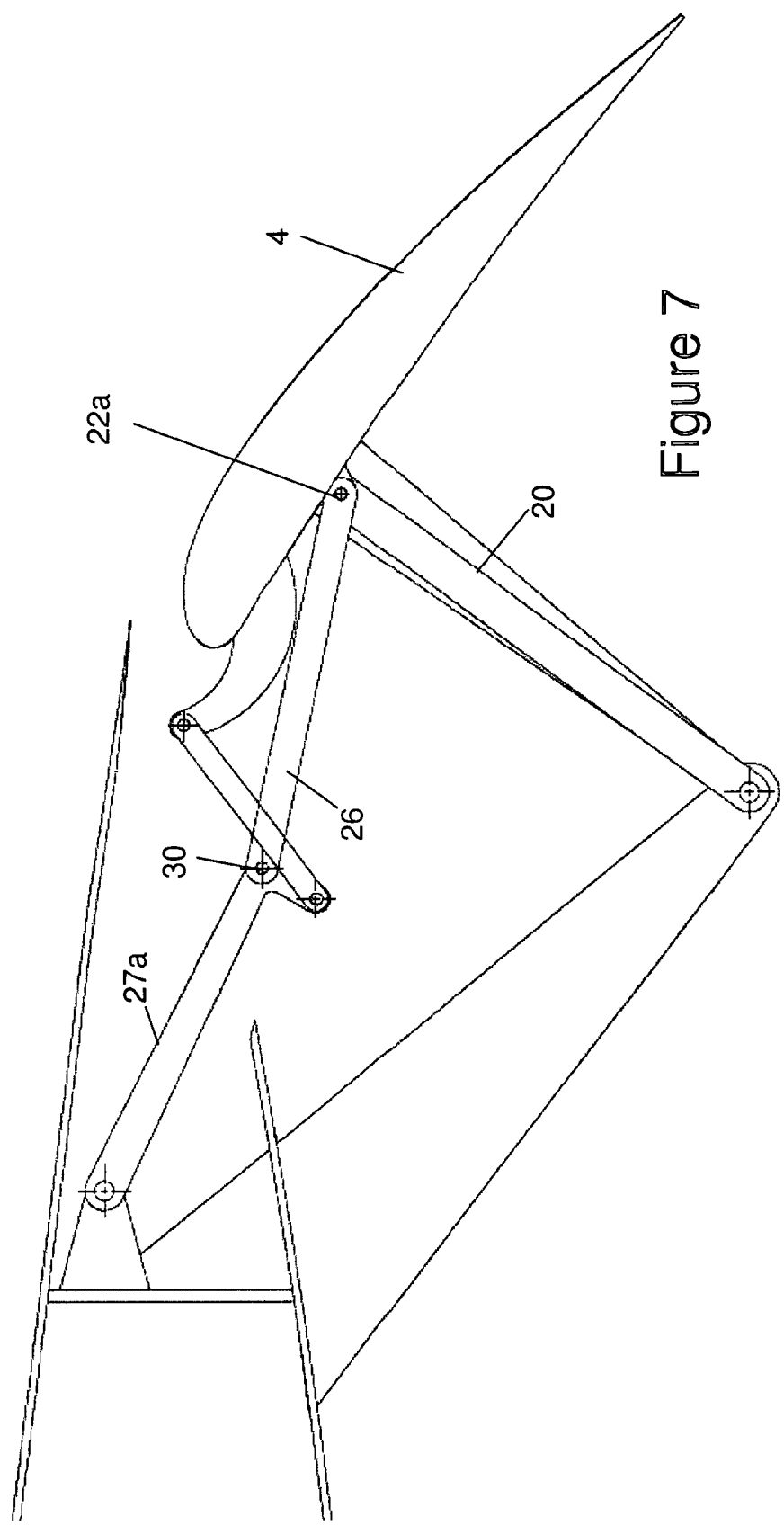
Figure 8:
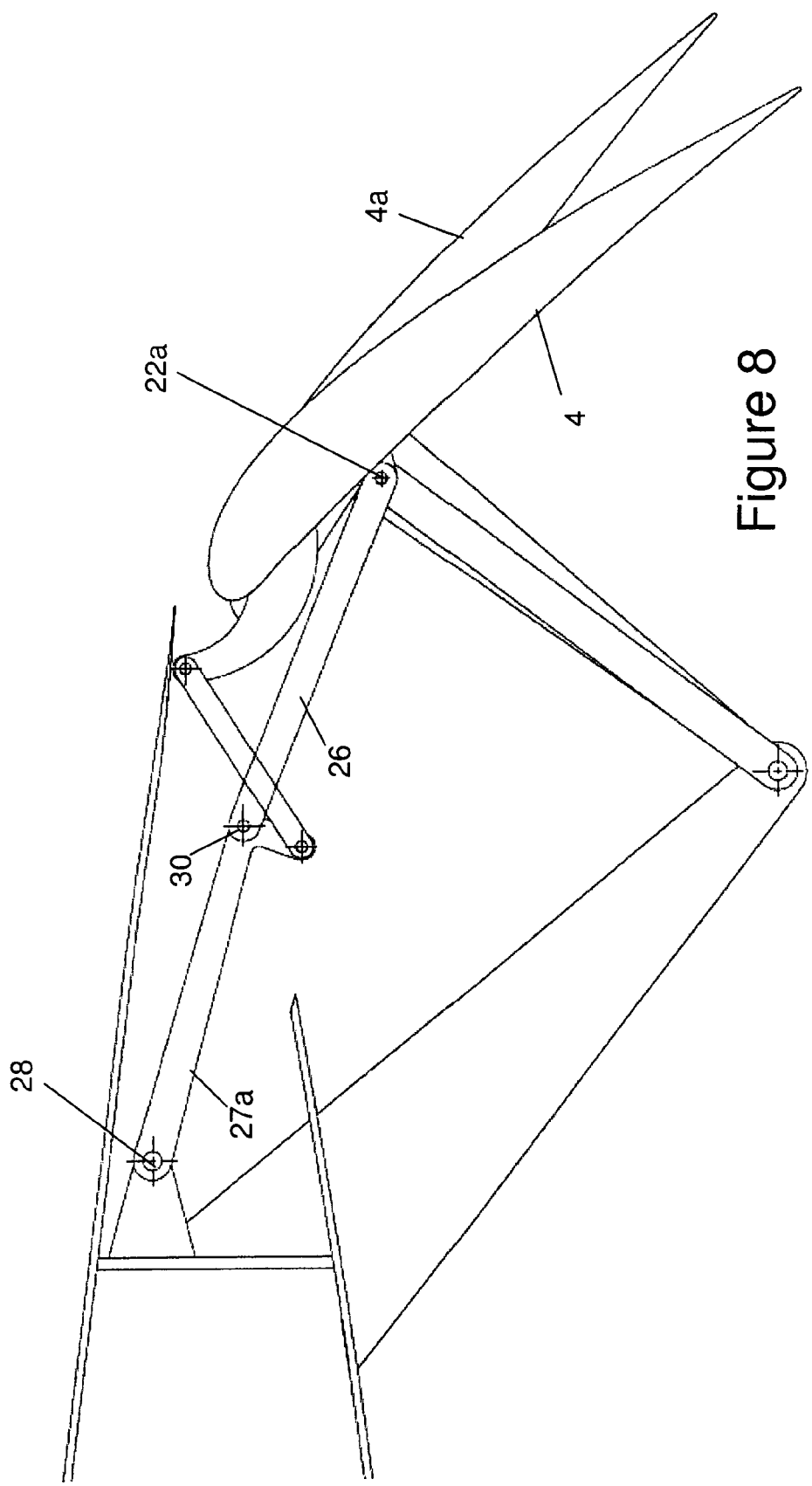

The movement of the flap will now be described with reference to FIGS. 4 to 8. FIG. 4 shows the flap in its fully retracted position, FIG. 8 shows the flap in its fully extended position, and FIGS. 5-7 show a series of intermediate positions. FIGS. 4-8 also show, for illustrative purposes, a flap 4a carried by a simple drop link 20a behind the flap 4. Note that the flap 4a is rigidly attached to the drop link 20a.

The bars 20, 26 and 27a, and the strut 14 can be considered to form a first four-bar linkage mechanism, which is in a crossed configuration in FIG. 2 and an open configuration in FIG. 3. As the lever 27 is rotated anticlockwise by the rotary actuator 31, this first four-bar linkage mechanism rotates the flap 4 and the drop link 20 clockwise about the first hinge 20.

The bars 23, 25, 26 and 27b can be considered to form a second four-bar linkage mechanism, which is in an open configuration in FIG. 2 and a crossed configuration in FIG. 3. As the lever 27 is rotated anticlockwise, this second four-bar linkage mechanism rotates the flap 4 relative to the drop link 20 about the second hinge 22.

The first and second four-bar linkage mechanisms are coupled with each other by virtue of the fact that the link 26 is common between the two mechanisms, and bars 27a and 27b are rigidly connected to each other.

In the retracted position shown in FIG. 4, the hinge 29 is positioned forward of a vertical line 32 passing through the hinge 28. Also the hinge 22a is positioned forward of a vertical line 33 passing through the hinge 21. Therefore the initial motion of the hinge 29 is down and the initial motion of the hinge 22a is up. As a result, in a first phase the second four-bar linkage mechanism rotates the flap 4 anticlockwise about the second hinge 22 relative to the drop link 20—that is, in an opposite direction to the rotation of the drop link 20 about the first hinge 21. The resultant compound motion can be described generally as a translation back and down relative to the main wing element (with little rotation). This can be best seen by a comparison of the angles of the flaps 4 and 4a in FIGS. 5 and 6. Note that in FIGS. 5 and 6 the flap 4 is relatively level, but the flap 4a is angled down.

As the hinges 29 and 22a move behind the vertical lines 33, 33, the motion of the flap 4 enters a second phase in which the second four-bar linkage mechanism rotates the flap 4 clockwise about the second hinge 22 relative to the drop link 20—that is, in the same direction as the rotation of the drop link 20 about the first hinge 21. Thus in the second phase the flap 4 first rotates to the same orientation as the flap 4a as shown in FIG. 7, then rotates down further as shown in FIG. 8.

Note that there is no abrupt transition between the first and second phases of motion—rather they merge smoothly into each other.

FIG. 7 shows the bars 27a and 26 approaching a straight line. As they do so, rotation of the drop link 20 reduces, and the dominant motion of the flap 4 is rotation about the hinge 22. After the bars 27a and 26 have gone "over centre", for a small third phase of motion (up to the fully extended position of FIG. 8) the drop link 20 is rotated anticlockwise as the flap 4 continues to be rotated clockwise relative to the drop link 20 about the second hinge 22.

Figure 9:
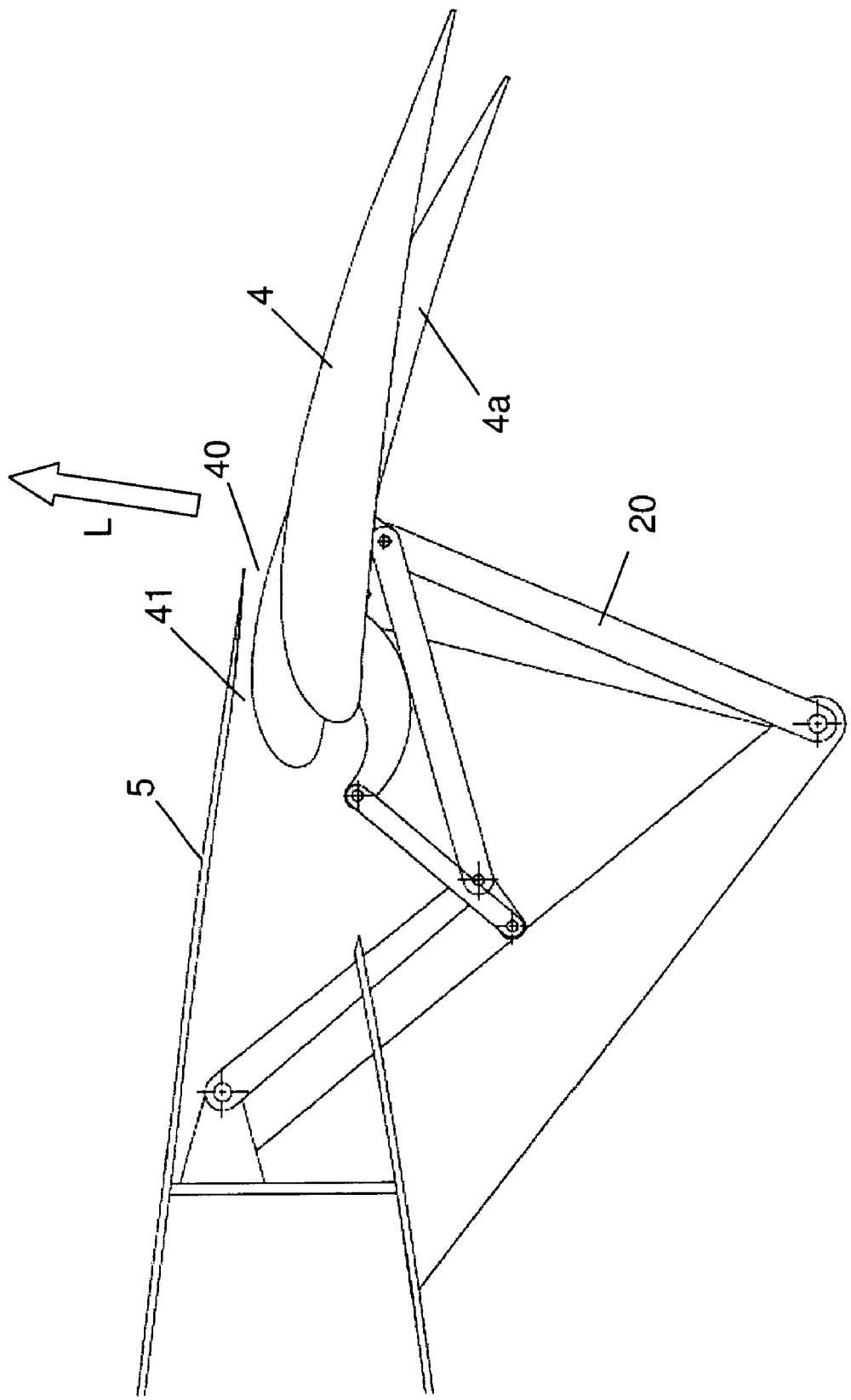
FIG. 9 shows the mechanisms of FIG. 4 in their take off positions.

FIG. 9 shows the mechanisms of FIG. 4 in their approximate take off positions. In the positions shown in FIG. 9, the lift generated by the flap 4 is approximately equal to the lift generated by the flap 4a. Note that the slot 40 between the flap 4 and the spoiler 5 is wider than the slot 41 between the flap 4a and the spoiler 5. If the slot 40 is considered to be too wide, then the flap 4 could be made thicker at its leading edge to close the slot 40, or the spoiler may droop down at the same time as the flap extends. Note also that the flap 4 is less tilted down than the flap 4a, but shows a larger horizontal displacement relative to the main wing element. As a result less drag is generated by the flap 4 than the flap 4a for the same amount of lift, thus giving a shorter take-off length. Note also that the slot 40 is not divergent, which reduces the likelihood of flow detachment compared with the divergent slot 41.

Figure 10:
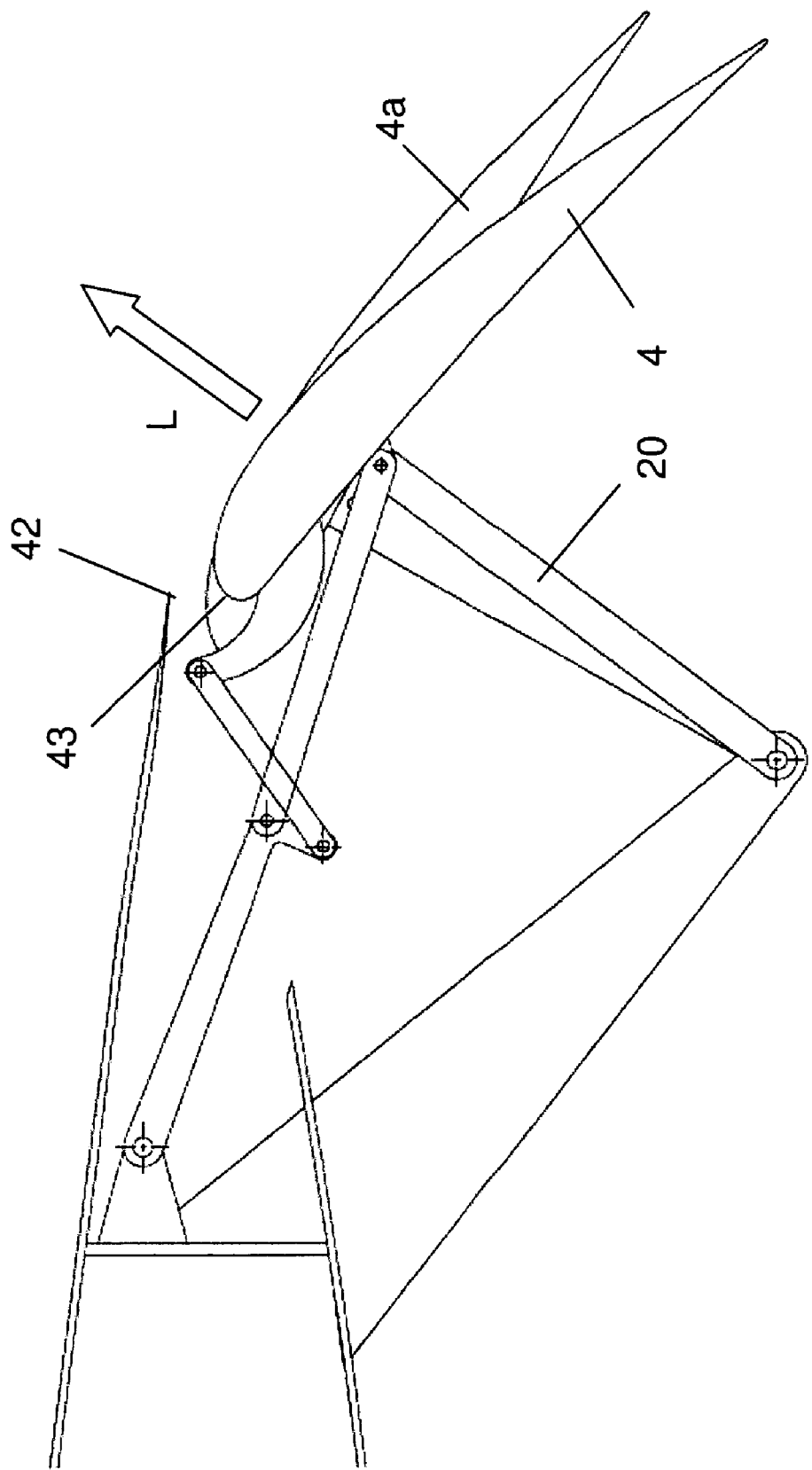
FIG. 10 shows the mechanisms of FIG. 4 in their landing positions.

FIG. 10 shows the flap 4a in its approximate landing position. Note that the flap 4 can be deployed to the position shown in FIG. 10, in which it is tilted down more than the flap 4a, whilst maintaining positive overlap between the trailing edge 42 of the spoiler 5 and the leading edge 43 of the flap 4. This high degree of rotation can be useful during landing, since it increases the camber of the wing (giving increased lift) and increases drag (which is desirable during landing).

Note that the drop link 20 is able to transmit lift forces (labelled by a vector L in FIGS. 9 and 10) efficiently from the flap to the main wing element, because the vector L is approximately aligned with the length of the drop link 20.

Note that the links 23 and 26 are bars which are substantially rigid between the hinges at each end of the bar. In an alternative embodiment (not shown) one or both of the rigid links 23, 26 may be replaced by a flexible link formed by two or more pivotally connected bars.

Although the invention has been described above with reference to one or more preferred embodiments, it will be appreciated that various changes or modifications may be made without departing from the scope of the invention as defined in the appended claims.

The invention claimed is:

1. Apparatus connecting an auxiliary lift foil to a main lift element, the apparatus comprising:
   a drop link pivotally coupled to the main lift element by a first hinge, said first hinge is fixed relative to the main lift element, and to the auxiliary lift foil by a second hinge, wherein the drop link is substantially rigid the entire distance between the first and second hinges; and
   a linkage mechanism pivotally coupled to the auxiliary lift foil by a third hinge which is spaced from the second hinge, and to the main lift element by a fourth hinge, said fourth hinge is fixed relative to said main lift element.

2. The apparatus of claim 1 wherein the linkage mechanism is pivotally coupled to the drop link and/or to the auxiliary lift foil by a fifth hinge.

3. The apparatus of claim 2 wherein the linkage mechanism comprises:
   a second link pivotally coupled to the auxiliary lift foil by the third hinge;
   a third link pivotally coupled to the drop link and/or the auxiliary lift foil by the fifth hinge; and
   a lever pivotally coupled to the main lift element by the fourth hinge, to the second link by a sixth hinge, and to the third link by a seventh hinge.

4. The apparatus of claim 2 wherein the fifth hinge is coaxial with the second hinge.

5. The apparatus of claim 3 further comprising a rotary actuator configured to rotate the lever about the fourth hinge.

6. The apparatus of claim 3 wherein the distance between the seventh hinge and the fourth hinge is greater than the distance between the seventh hinge and the sixth hinge.

7. The apparatus of claim 3 wherein the second link is substantially rigid between the third and sixth hinges.

8. The apparatus of claim 3 wherein the third link is substantially rigid between the fifth and seventh hinges.

9. The apparatus of claim 3 wherein the lever is substantially rigid between the fourth, sixth and seventh hinges.

10. A lift foil comprising a main lift element; an auxiliary lift foil;
    and apparatus according to claim 1 connecting the auxiliary lift foil to the main lift element.

11. The lift foil of claim 10 wherein the auxiliary lift foil comprises a trailing edge flap.

12. The lift foil of claim 10 wherein the main lift element comprises:
    an upper aerodynamic surface;
    a lower aerodynamic surface; and
    a strut extending downwardly from the lower dynamic surface and carrying the first hinge.

13. The apparatus of claim 1 wherein the main lift element comprises a main wing element and the auxiliary lift foil comprises an auxiliary aerofoil.

* * * * *